US011732645B2

(12) United States Patent
Durocher

(10) Patent No.: US 11,732,645 B2
(45) Date of Patent: Aug. 22, 2023

(54) BLEED AIR OFFTAKE ASSEMBLY FOR A GAS TURBINE ENGINE

(71) Applicant: PRATT & WHITNEY CANADA CORP., Longueuil (CA)

(72) Inventor: Eric Durocher, Boucherville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/367,774

(22) Filed: Jul. 6, 2021

(65) Prior Publication Data

US 2023/0008514 A1    Jan. 12, 2023

(51) Int. Cl.
*F02C 6/08* (2006.01)
*F01D 9/06* (2006.01)
*F01D 17/14* (2006.01)

(52) U.S. Cl.
CPC ............. *F02C 6/08* (2013.01); *F01D 9/06* (2013.01); *F01D 17/145* (2013.01);
(Continued)

(58) Field of Classification Search
CPC .... F02C 7/24; F02C 6/08; F02C 7/045; F02K 3/02; F02K 3/06; F01D 17/14; B64D 13/06
See application file for complete search history.

(56) References Cited

U.S. PATENT DOCUMENTS 6,438,941 B1 * 8/2002 Elliott ............... F02C 9/18
60/785
7,556,223 B2 * 7/2009 Acheson ............ B64D 37/005
244/129.1

(Continued)

FOREIGN PATENT DOCUMENTS

CN    110 439 692 A    11/2019
EP    3 163 054 A1    5/2017

OTHER PUBLICATIONS

European Search Report issued in counterpart application 22183184.5 dated Nov. 22, 2022.

*Primary Examiner* — Todd E Manahan
*Assistant Examiner* — Rodolphe Andre Chabreyrie
(74) *Attorney, Agent, or Firm* — Norton Rose Fulbright Canada LLP

(57) ABSTRACT

A gas turbine engine comprising: a duct extending about an axis, the duct including an outer-duct wall having an interior-duct surface circumscribing an interior of the duct and an exterior-duct surface radially outward of the interior-duct surface relative to the axis, the outer-duct wall defining an offtake opening extending from the interior-duct surface to the exterior-duct surface, the offtake opening in fluid communication between an offtake location inside the duct and outside the duct, and a bleed air offtake assembly including: an air line in fluid communication with inside the duct via the offtake opening, the air line having a first-line end defining a line inlet proximate to the outer-duct wall and a second-line end spaced from the first-line end; a valve located outside the duct and fluidly connected to the air line via the second-line end, and a conduit having a conduit inlet in fluid communication with inside the air line at a resonance location between the first-line end and the second-line end upstream of the valve, and a conduit outlet in fluid communication with inside the duct at a relief location spaced from the offtake location.

18 Claims, 7 Drawing Sheets

(52) U.S. Cl.
CPC .. *F05D 2220/323* (2013.01); *F05D 2250/231* (2013.01); *F05D 2260/606* (2013.01)

(56) References Cited

U.S. PATENT DOCUMENTS

| | | |
|---|---|---|
| 10,544,737 B2 | 1/2020 | Bowden et al. |
| 2010/0126182 A1 | 5/2010 | Hoover et al. |
| 2017/0122213 A1* | 5/2017 | Bowden .................. F02C 6/08 |
| 2020/0182081 A1* | 6/2020 | Sidorovich Paradiso .................. F01D 17/14 |

* cited by examiner

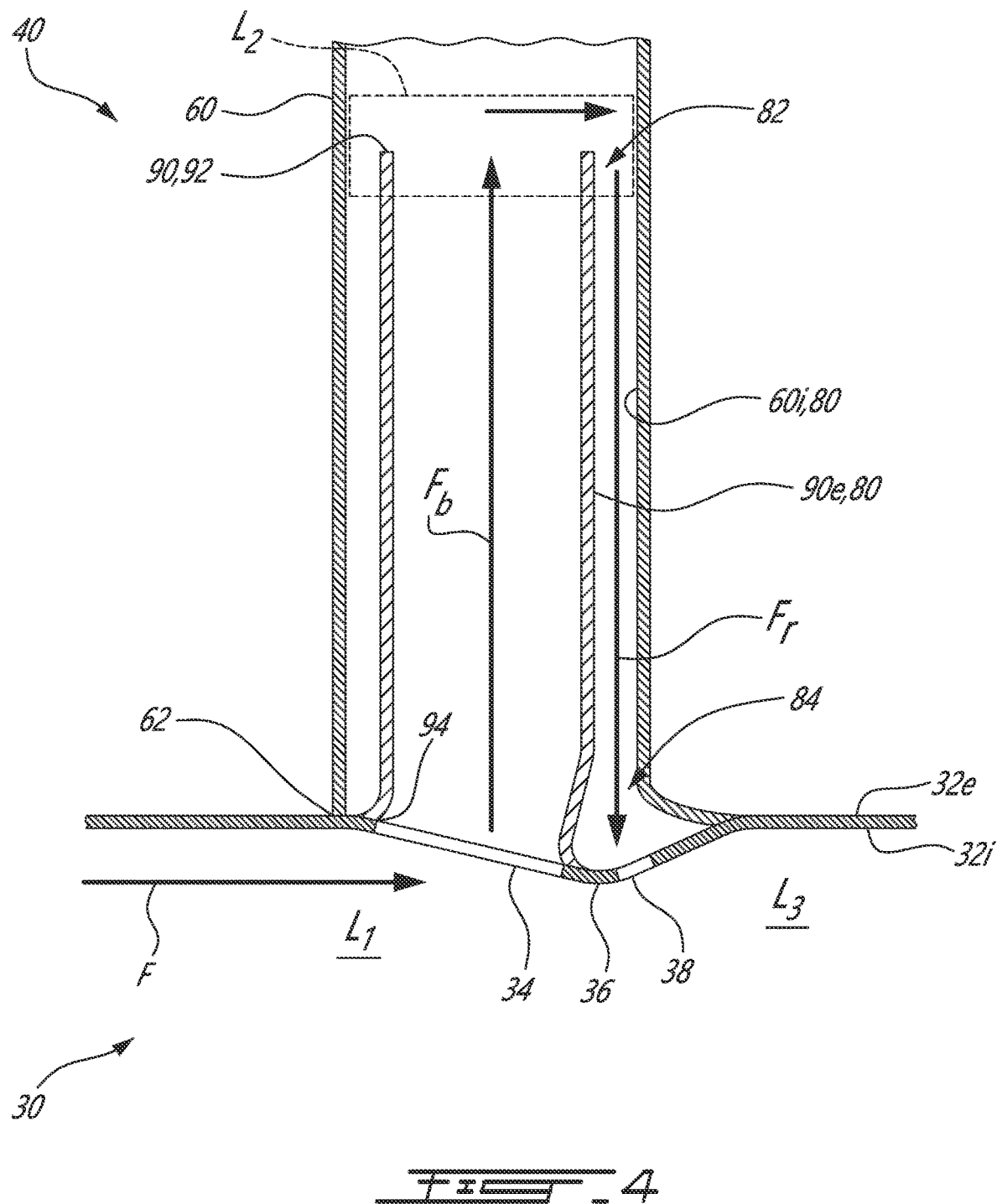

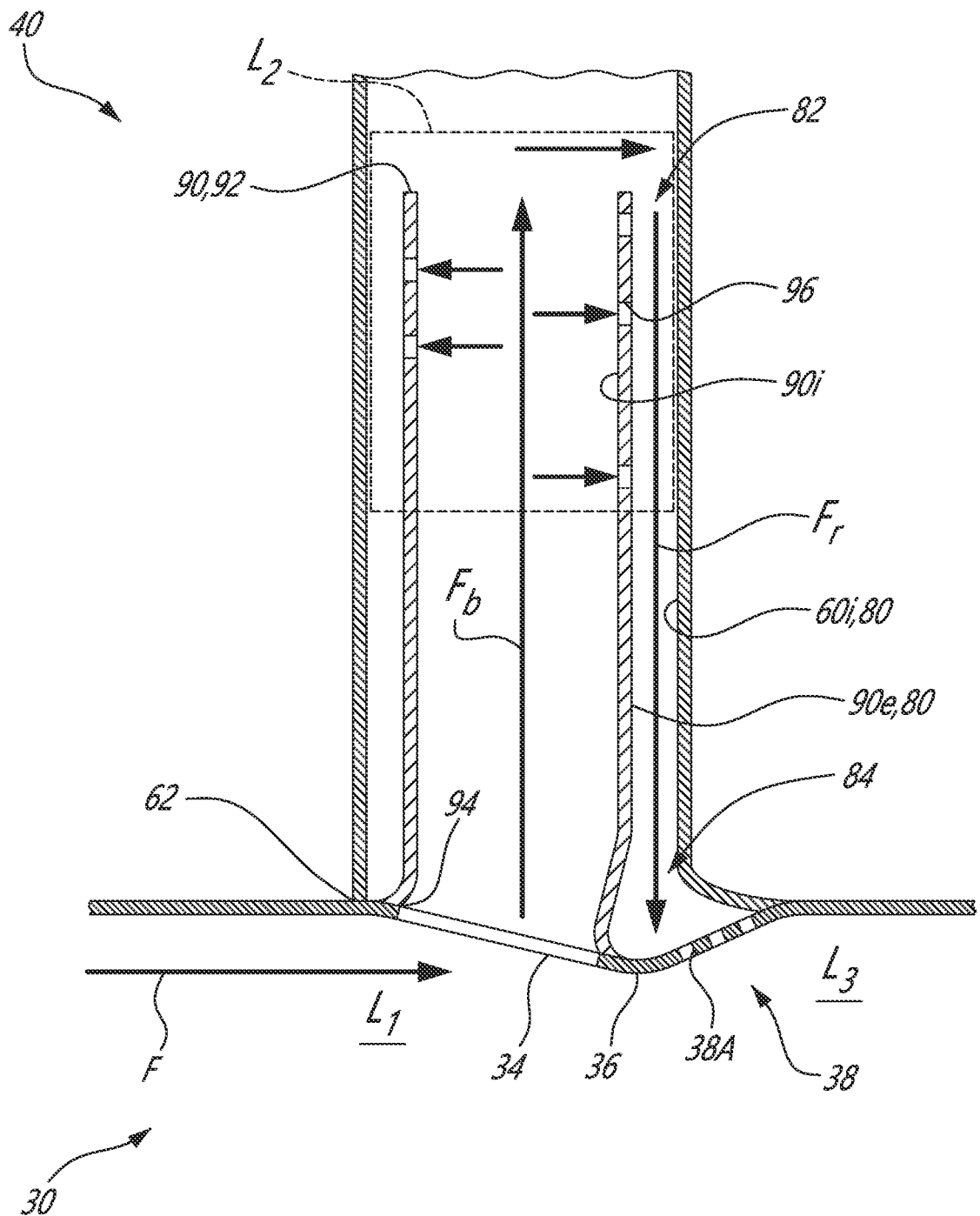

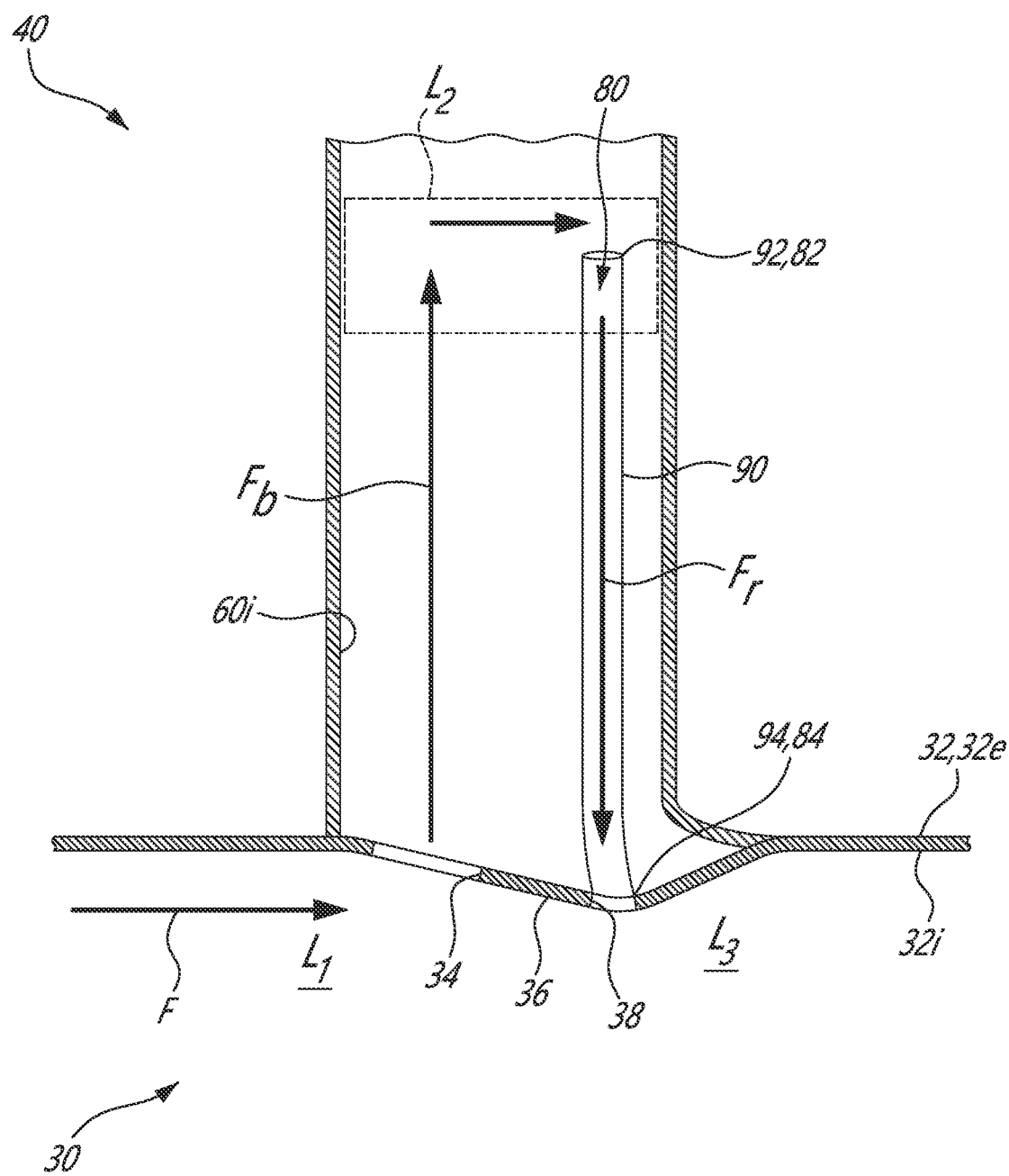

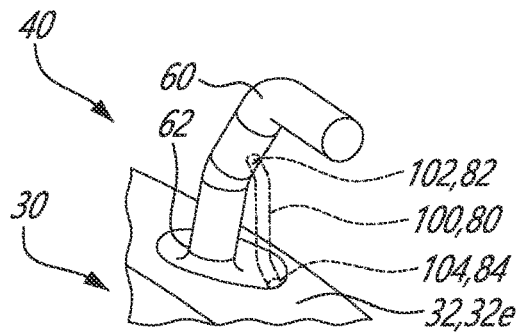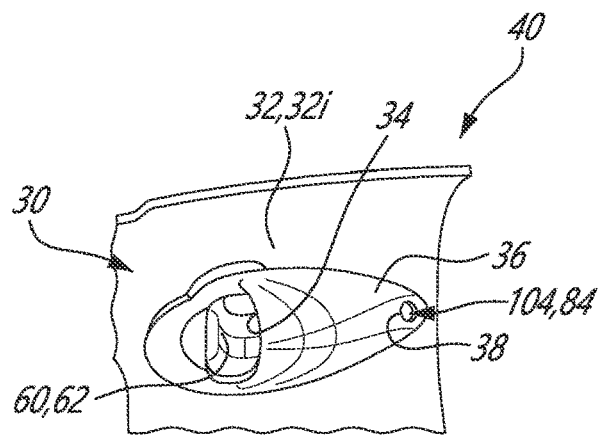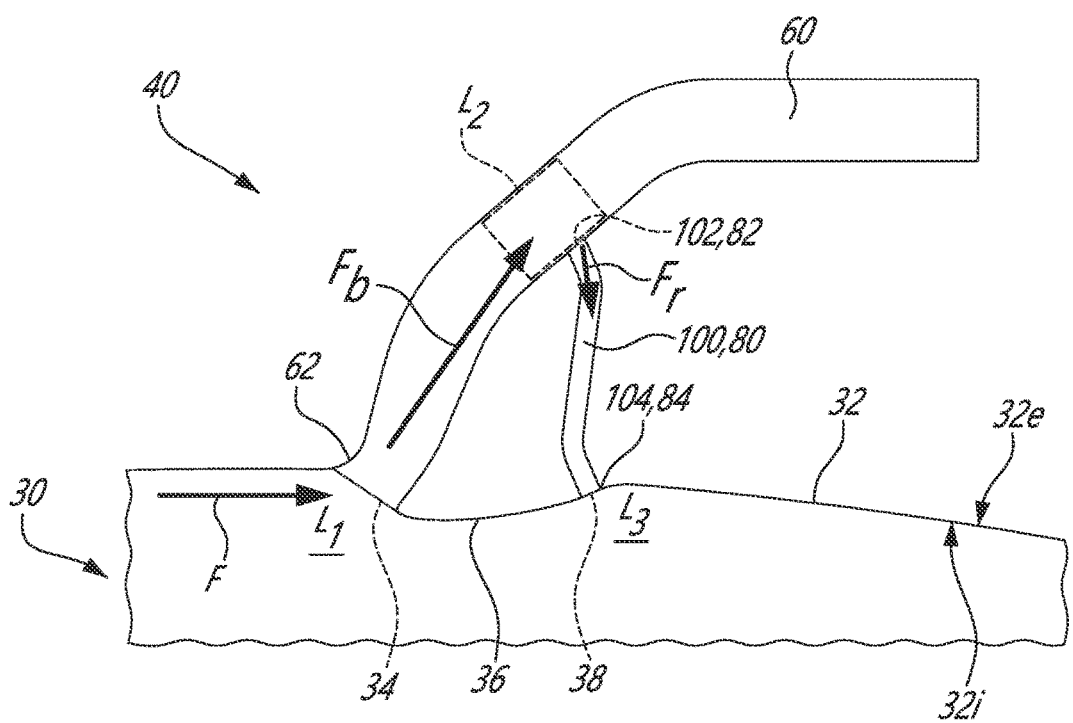

BLEED AIR OFFTAKE ASSEMBLY FOR A GAS TURBINE ENGINE

TECHNICAL FIELD

The application relates generally to aircraft engines and, more particularly, to turbine engines having bleed air systems.

BACKGROUND OF THE ART

Bleed air is provided by a gas turbine engine to be used for engine functions (such as cooling of turbines and to help seal bearing cavities, for example) and, as the case may be, for aircraft functions (such as wing de-icing, cabin pressurization, cabin climate control, liquid tank pressurization, etc.). Depending on the type of engine and on the levels of pressure and temperature needed, bleed air can be derived from an air intake duct or compressor cavity. While typical conventional bleed air systems may be suitable for their intended purposes, aerodynamics and/or performance of such existing systems may nevertheless be improved upon.

SUMMARY

In an aspect of the present technology, there is provided a gas turbine engine comprising: a duct extending about an axis, the duct including an outer-duct wall having an interior-duct surface circumscribing an interior of the duct and an exterior-duct surface radially outward of the interior-duct surface relative to the axis, the outer-duct wall defining an offtake opening extending from the interior-duct surface to the exterior-duct surface, the offtake opening in fluid communication between an offtake location inside the duct and outside the duct, and a bleed air offtake assembly including: an air line in fluid communication with inside the duct via the offtake opening, the air line having a first-line end defining a line inlet proximate to the outer-duct wall and a second-line end spaced from the first-line end; a valve located outside the duct and fluidly connected to the air line via the second-line end, and a conduit having a conduit inlet in fluid communication with inside the air line at a resonance location between the first-line end and the second-line end upstream of the valve, and a conduit outlet in fluid communication with inside the duct at a relief location spaced from the offtake location.

In another aspect of the present technology, there is provided a gas turbine engine comprising: a duct extending about an axis, the duct including an outer-duct wall having an interior-duct surface circumscribing an interior of the duct and an exterior-duct surface radially outward of the interior-duct surface relative to the axis, the outer-duct wall defining an offtake opening extending from the interior-duct surface to the exterior-duct surface, the offtake opening in fluid communication between inside the duct and outside the duct, and a bleed air offtake assembly including: an air line in fluid communication with inside the duct via the offtake opening, the air line having a first-line end defining a line inlet proximate to the outer-duct wall and a second-line end spaced from the first-line end; a valve located outside the duct and fluidly connected to the air line via the second-line end, and a tube extending from the exterior-duct surface to a resonance location inside the air line, the tube having an exterior-tube surface surrounded by an interior-line surface of the air line so as to define an annular conduit therebetween, the annular conduit in fluid communication between the resonance location and inside the duct.

DESCRIPTION OF THE DRAWINGS

Reference is now made to the accompanying figures in which:

FIG. 4 is a schematic, cross-sectional view of a portion of another bleed air offtake assembly according to an embodiment;

FIG. 5 is a schematic, cross-sectional view of a portion of another bleed air offtake assembly according to an embodiment;

FIG. 6 is a schematic, cross-sectional view of a portion of another bleed air offtake assembly according to an embodiment;

FIG. 7 is a cutaway view of an exterior of a casing wall shown with a portion of another bleed air offtake assembly according to an embodiment;

FIG. 8 is a cutaway view of an interior of the casing wall of FIG. 6 shown with the portion of the bleed air offtake assembly of FIG. 6, and FIG. 9 is a schematic cross-sectional view of the casing wall and of the portion of the bleed air offtake assembly of FIG. 6.

DETAILED DESCRIPTION

Figure 1A:
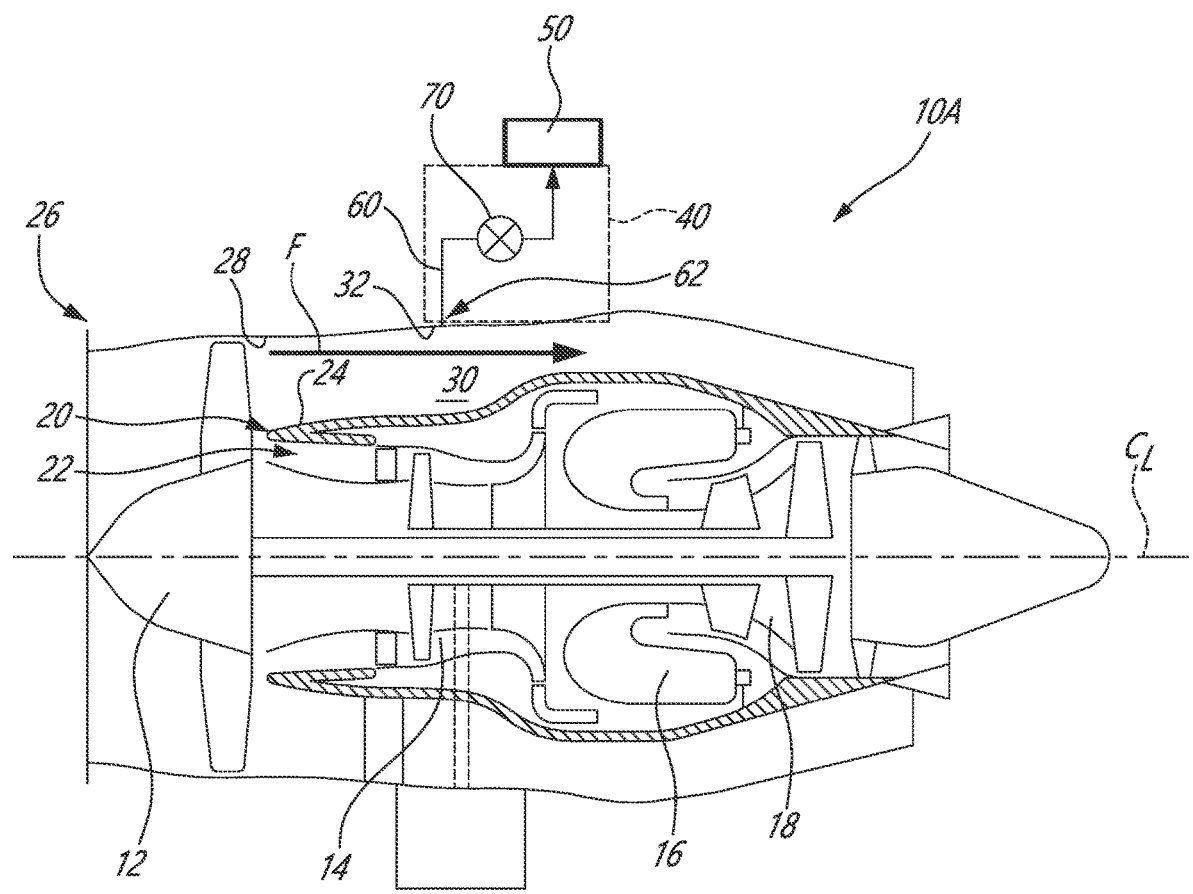
FIG. 1A is a schematic cross-sectional view of a turbofan gas turbine engine having a casing provided with a bleed air offtake assembly according to an embodiment.

FIG. 1A illustrates a gas turbine engine 10A being of a turbofan type preferably provided for use in an aircraft for subsonic flight, generally comprising in serial flow communication along a centerline CL a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The compressor section 14 and the turbine section 18 form part of an engine core 20. The engine core 20 defines a main fluid path 22 in which the combustor 16 is provided. The engine core 20 has an annular wall facing radially outwardly relative to the centerline CL, referred to as a core wall 24. The core wall 24 is positioned coaxially and radially inwardly of a nacelle 26 of the engine 10A. The nacelle 26 has an annular wall facing radially inwardly relative to the centerline CL, referred to as an engine wall 28. The core wall 24 and the engine wall 28 together define an annular bypass duct 30 for directing an air flow F (the flow F) drawn by the fan 12 such that the flow F bypasses the main fluid path 22. Hence, the core wall 24 and the engine wall 28 can also be respectively referred to as inner and outer walls of the duct 30. A bleed air offtake assembly 40 (the offtake assembly 40) is fluidly connected to the duct 30 such that some of the air flow F may be drawn from the duct 30 by the offtake assembly 40 to drive and/or supply one or more pneumatically-driven aircraft systems 50 connected thereto. Stated otherwise, the offtake assembly 40 is operatively connected to the duct 30. In this case, the offtake assembly 40 is connected to an annular outer-duct wall 32 (the outer-duct wall 32) of the duct 30 being a portion of the engine wall 28 spaced aft from an inlet of the duct 30. Depending on the implementation, the outer-duct wall 32 to which the offtake assembly 40 is located can be located between a fan outer bypass vane and a bypass air-exhaust gas mixer of the engine 10.

The offtake assembly 40 generally includes an air line 60 (the line 60) having a first-line end defining a line inlet 62 in fluid communication with inside the duct 30 via the outer-duct wall 32 and a second-line end opposite the first-line end, a valve 70 located outside the duct 30 and fluidly connected to the line 60 via the second-line end, and a pressure-relief conduit 80 (the conduit 80, FIG. 2) having opposite ends respectively in fluid communication with inside the line 60, at a location between the first-line end and the second-line end upstream of the valve 70, and with inside the duct 30. In some implementations, the valve 70 is fluidly connected between the line 60 and a pre-cooler being a part of the one or more aircraft systems 50.

Figure 1B:
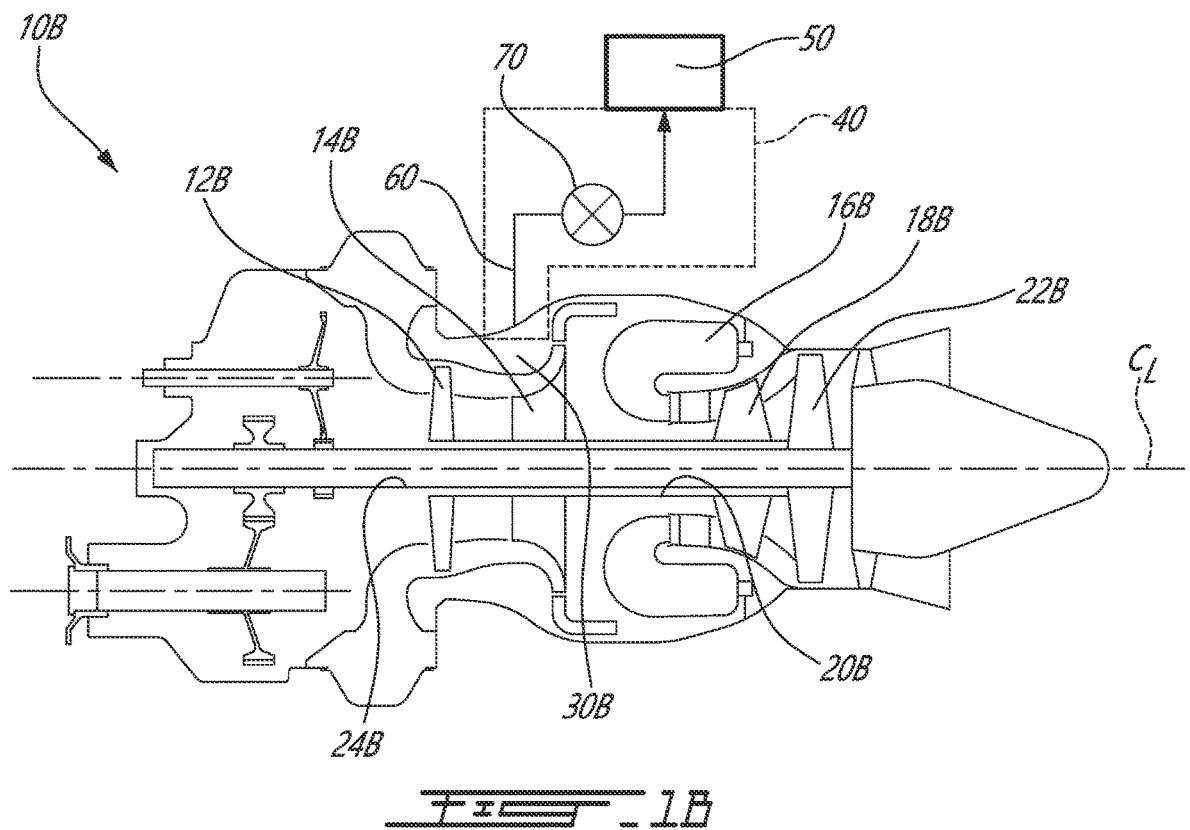
FIG. 1B is a schematic cross-sectional view of a turboshaft gas turbine engine having a compressor casing provided with a bleed air offtake assembly according to an embodiment.

While the engine 10A is of a turbofan type and the offtake assembly 40 is located radially outward of the duct 30, the offtake assembly 40 may be employed with any other suitable engine type and at any suitable location thereof. For instance, referring to FIG. 1B, another gas turbine engine 10B is shown. In this example, the engine 10B is a turboshaft engine generally comprising in serial flow communication a low pressure compressor section (or first stage compressor) 12B and a high pressure compressor section (or second stage compressor) 14B for pressurizing air, a combustor 16B in which the compressed air is mixed with a fuel flow delivered to the combustor 16B via fuel nozzles of a fuel system (not depicted) and ignited for generating a stream of hot combustion gases, a high pressure turbine section 18B for extracting energy from the combustion gases and driving the high pressure compressor section 14B via a high pressure shaft 20B, and a low pressure turbine section 22B for further extracting energy from the combustion gases and driving the low pressure compressor section 12B via a low pressure shaft 24B. The offtake assembly 40 is operatively connected to a duct or air plenum 30B defining a compressor bleed cavity of the high pressure compressor section 14B.

Figure 1C:
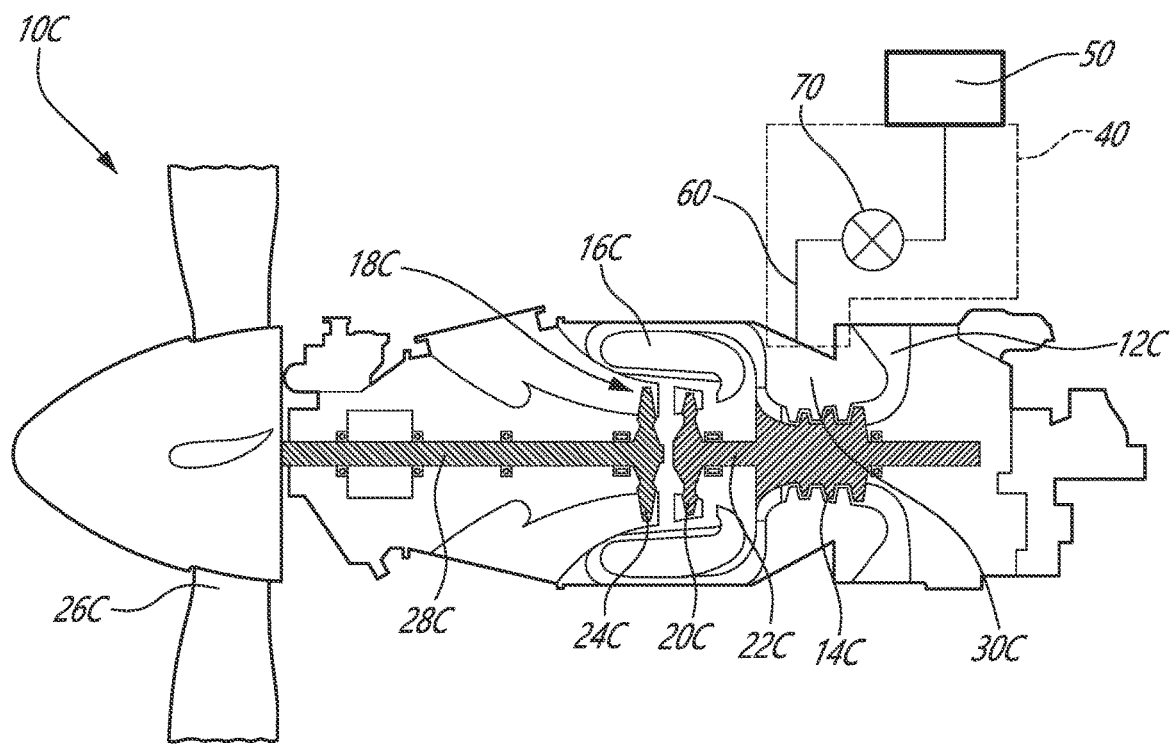
FIG. 1C is a schematic cross-sectional view of a turboprop gas turbine engine having compressor casing provided with a bleed air offtake assembly according to an embodiment.

Turning now to FIG. 1C, another gas turbine engine 100 is shown. In this example, the engine 100 is a turboprop engine generally comprising in serial flow communication an air inlet 12C through which ambient air enters the engine, a compressor section 14C for pressurizing the air, a combustor 16C in which the compressed air is mixed with fuel and ignited for generating an annular stream of hot combustion gases, and a turbine section 18C for extracting energy from the combustion gases. The turbine section 18C includes a compressor turbine section 20C driving the rotor(s) of the compressor section 14C through a compressor shaft 22C, and a free power turbine section 24C driving a propeller 26C through a power shaft 28C. The offtake assembly 40 is operatively connected to a duct or air plenum 30C defining a compressor bleed cavity of the compressor section 14C.

It shall be noted that whereas implementations of the offtake assembly 40 described henceforth relate specifically to the engine 10A, such implementations also apply, mutatis mutandis, to other engines such as for example the engines 10B and 100.

Figure 2:
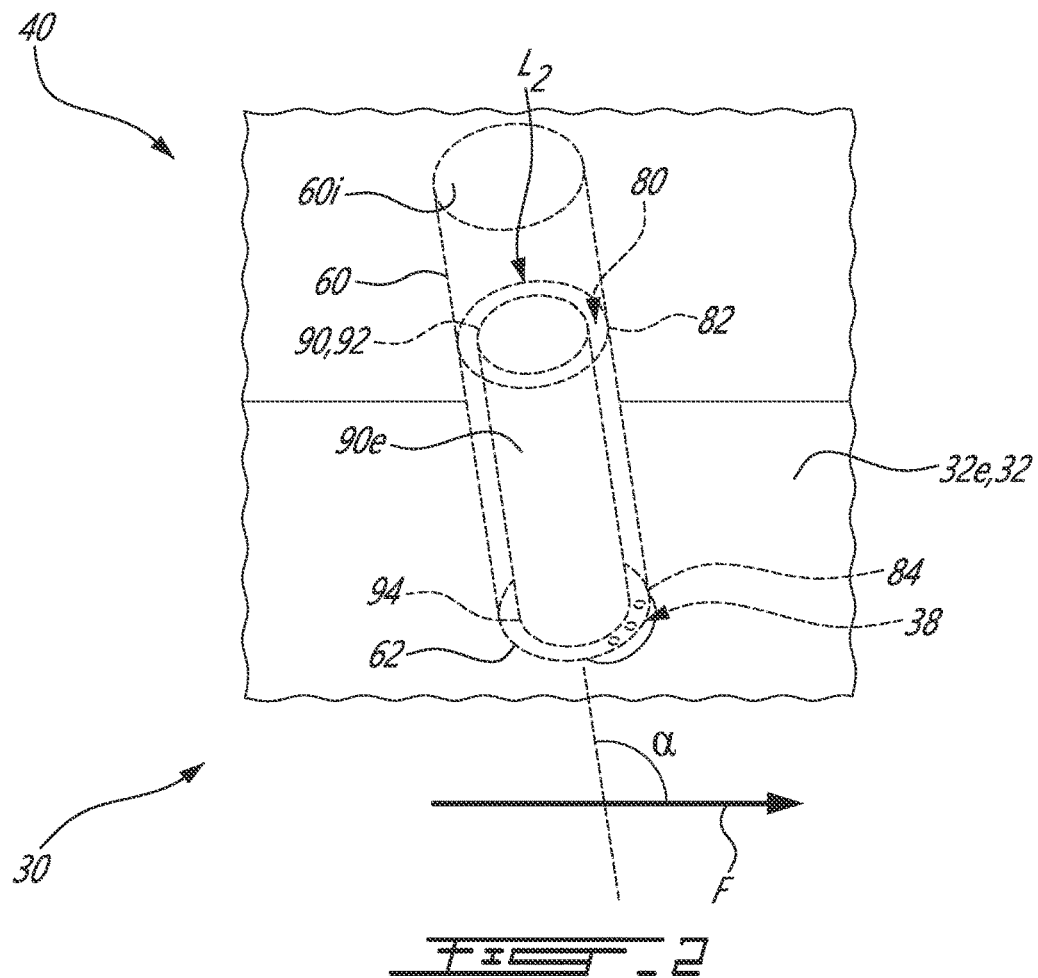
FIG. 2 is a perspective view of an exterior of an outer wall of the casing of FIG. 1 and of a portion of the bleed air offtake assembly of FIG. 1 according to an embodiment.
Figure 3:
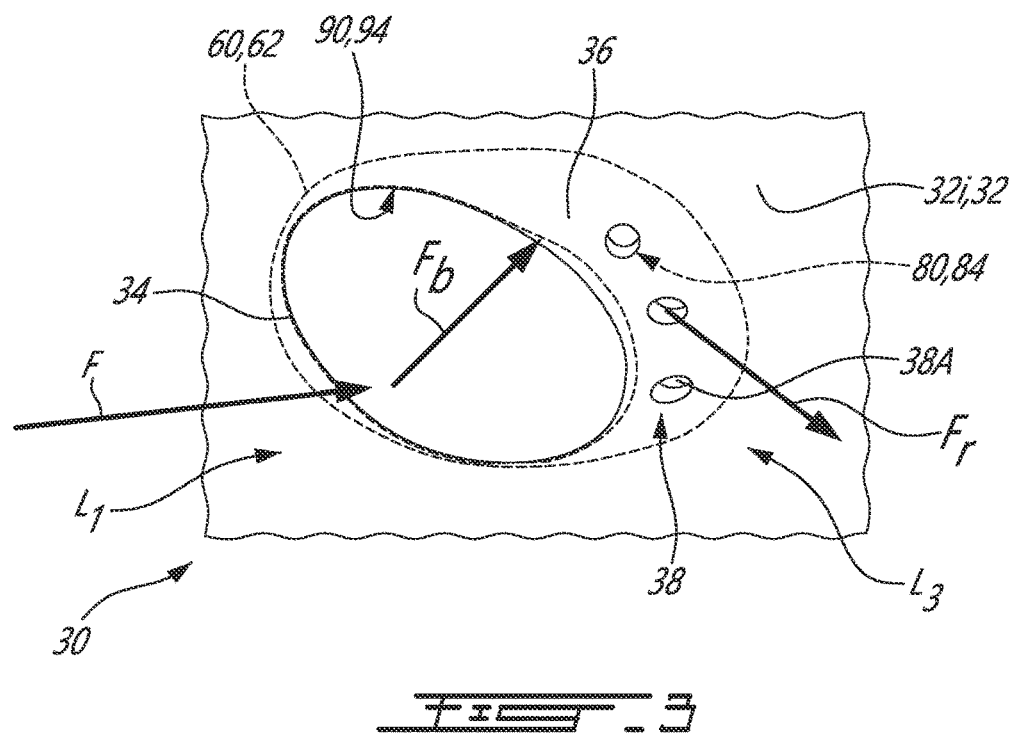
FIG. 3 is a perspective view of an interior of the casing wall and of the portion of the bleed air offtake assembly of FIG. 2.

In FIG. 2, portions of the offtake assembly 40 proximate to the outer-duct wall 32 are shown, including a portion of the line 60 having the line inlet 62 and including the conduit 80, whereas the valve 70 and a portion of the line 60 proximate to the valve 70 have been removed. The line 60 is a tubular structure which, in this embodiment, features the line inlet 62 having a cylindrical shape projecting outwardly from an exterior-duct surface 32e of the outer-duct wall 32. In this example, the line 60 extends from line inlet 62 at an angle α to the exterior-duct surface 32e so as to be inclined relative to the flow F. Depending on the implementation, the line 60 can be inclined rearwardly (i.e., cocurrent relative to the flow F), at a right angle or forwardly (i.e., crosscurrent relative to the flow F). Other shapes and orientations for the line inlet 62 are possible, so long as suitable aerodynamics are attained. Indeed, the flow F must be partially drawn into the line 60 from inside the duct 30 such that a bleed air flow Fb (the bleed flow Fb, FIG. 3) having suitable aerodynamic properties is delivered to the valve 70. For this purpose, as depicted in FIG. 3, the line 60 is in fluid communication with an offtake location L1 inside the duct 30 via an offtake opening 34 defined through the outer-duct wall 32. The offtake opening 34 extends from an interior-duct surface 32i (FIG. 3) of the outer-duct wall 32 to the exterior-duct surface 32e. The offtake location L1 adjoins a fore, high-pressure side of the offtake opening 34. In the present embodiment, the outer-duct wall 32 has a boss 36 projecting into the duct 30. The offtake opening 34 is defined at least partially onto an upstream, fore-facing side of the boss 36 such that the offtake opening 34 at least partially faces the flow F. Stated otherwise, the boss 36 and the offtake opening 34 are arranged relative to the interior-duct surface 32i such that as the flow F runs along the interior-duct surface 32i at the offtake location L1, a portion of the flow F is incident relative to the offtake opening 34. Outside the duct 30, the line inlet 62 is joined to the exterior-duct surface 32e so as to surround the offtake opening 34, forming a seal therewith preventing air entering the offtake opening 34 from bypassing the line 60.

With reference to FIG. 2, characteristics of the offtake assembly 40 pertaining to the conduit 80 will now be described. In this embodiment, the conduit 80 is provided in the form of an elongated volume partitioned inside the line 60. The conduit 80 has opposite open ends, respectively a conduit inlet 82 in fluid communication with a resonance location L2 inside the line 60 distanced from both the line inlet 62 and the valve 70, and a conduit outlet 84 in fluid communication with a relief location L3 (FIG. 3) inside the duct 30. As an example, the relief location L3 adjoins an aft, low-pressure side of the offtake opening 34. The relief location L3 is thus located aft of the offtake location L1, although it does not have to be the case, as will be explained hereinbelow. A tube 90 of the offtake assembly 40 is received inside the line 60 in an overlaid yet spaced positioning relative to the line 60. The line 60 surrounds the tube 90 as the line 60 extends away from the exterior-duct surface 32e so as to define the conduit 80 between an interior-line surface 60i of the line 60 and an exterior-tube surface 90e of the tube 90. A distal-tube end 92 of the tube 90 is located at the resonance location L2 and is surrounded by the interior-line surface 60i. A proximal-tube end 94 of the tube 90 opposite the distal-tube end 92 is joined to the exterior-duct surface 32e so as to follow a periphery of the offtake opening 34 and be surrounded by the interior-line surface 60i. The proximal-tube end 94 forms a seal with the exterior-duct surface 32e proximate to the periphery of the offtake opening 34, forcing air having exited the duct 30 via the offtake opening 34 to travel through the tube 90 before it may pressurize the line 60 at the resonance location L2 and enter the conduit 80. At the distal-tube end 92, an exterior-tube surface 90e of the tube 90 defines an inner boundary of the conduit inlet 82. At the proximal-tube end 94, the exterior-tube surface 90e defines an inner boundary of the conduit outlet 84. Outer boundaries of the conduit inlet 82 and conduit outlet 84 are respectively defined by the interior-line surface 60i. It shall be noted that the line 60 and the tube 90 are shaped and positioned relative to one another such that a portion of the conduit 80 located at the resonance location L2 is annular in shape. Indeed, at the resonance location L2, the line 60 and the tube 90 respectively have cylindrical shapes that are coaxial to one another. However, other shapes are contemplated, insofar as the conduit 80 forms a fluid passage from the conduit inlet 82 to the conduit outlet 84 for a relief flow Fr to travel via the conduit 80 from the resonance location L2 to the relief location L3. For example, the line 60 and the tube 90 may be routed so as to follow different paths as they extend outward of the duct 30, imparting the conduit 80 with a non necessarily annular shape. For example, one of the line 60 and the tube 90 may follow a straight path and the other a curvilinear path. One or both of the line 60 and the tube 90 may have a non-circular cross-section. Depending on the implementation, the line 60 and the tube 90 may be constructed of composite and/or metallic materials, such as stainless steel or titanium. In some embodiments, for instance those implemented in a hot engine section (FIG. 1C), the line 60 is constructed of a metallic material suitable for withstanding high temperatures and for shielding the tube 90 from such high temperatures. In some such embodiments, the tube 90 is constructed of a composite material. In some embodiments implemented in a cold engine section (FIG. 1A), the line 60 and the tube 90 are constructed of composite materials.

With reference to FIG. 3, the conduit 80 is in fluid communication with the relief location L3 inside the duct 30 via a relief opening 38 defined through the outer-duct wall 32 from the exterior-duct surface 32e to the interior-duct surface 32i. In this example, the relief opening 38 is provided in the form of a plurality of bores 38A positioned so as to be in communication between the conduit outlet 84 and the relief location L3. The bores 38A are distributed arcuately next to one another peripherally to the proximate-tube end 94 and so as to be surrounded by the line inlet 62. Such a multi-opening arrangement for the relief opening 38 can advantageously assist the relief flow Fr from migrating from inside the conduit 80 to inside the duct 30 while maintaining the structural integrity of the duct 30. The relief opening 38 is defined at least partially onto a downstream, aft-facing side of the boss 36 so as to direct the relief flow Fr concurrently to the flow F away from the offtake opening 34. Other shapes and spatial arrangements for the relief opening 38 are possible.

Referring to FIG. 4, in operation, the air flow F flows inside the duct 30 from the inlet to the offtake location L1 on the high-pressure side of the offtake opening 34, and supplies the bypass flow Fb into the offtake assembly 40. As air enters through the offtake opening 34, flow separation and vortex shedding of the bypass flow Fb occur proximate to the line inlet 62, leading to cyclical pressurization (i.e., pressure amplitude spikes, or dashes) inside the line 60 upon the valve 70 being closed. Such pressurization builds up upstream of the valve 70 and is maximized at the resonance location L2 along the interior-line surface 60i. The resonance location L2 encompasses a portion of the interior line surface 60i most solicited by the pressurization, and is referred to as such due to the vibration of the line 60 and resulting acoustic tones emitted thereby under certain operating conditions of the engine 10A. It shall be noted that the tube 90 is sized and arranged such that the conduit 80 extends to the resonance location L2, i.e., the conduit inlet 82 is located proximate to the resonance location L2. As such, the pressure building up at the resonance location L2 is maintained under a certain desired maximum level, or built-up pressure, by allowing pressure in excess of the built-up pressure to be relieved via the conduit 30. Indeed, by circulating a relief flow Fr from inside the line 60 at the resonance location L2, through the conduit 80 and into the duct 30 via the relief opening 38, air which would otherwise be trapped in the line 60, dash against the interior line surface 60i and cause vibration at the resonance location L2 to be amplified, is instead released from the line 60.

The line 60 is sized and arranged relative to the duct inlet such that upon the duct 30 being at an intake pressure at the duct inlet and the valve 70 being closed, an offtake pressure at the offtake location L1 is less than the intake pressure, and built up pressure at the resonance location L2 is greater than the offtake pressure. Upon the valve 70 being closed, the built up pressure at the resonance location L2 is greater than a relief pressure inside the duct 30 at the relief location L3. This creates a positive pressure differential between inside the line 60 at the resonance location L2 and inside the duct 30 at the relief location L3, allowing the relief of the excess pressure to occur via the conduit 80. It should be noted that the built up pressure is also greater than an offtake pressure inside the duct 30 at the offtake location L1. Hence, in other embodiments, the relief location L3 and the offtake location L1 (and, conversely, the relief opening 38 and the offtake opening 34) may be at a same distance from the inlet, or the relief location L3 may even be upstream of the offtake location L1, so long as a suitable positive pressure differential is attained. Upon the valve 70 being open, the resonance location L2 is at a pressure that is less than inside the duct 30 at either the offtake location L1 or the relief location L3.

Referring to FIGS. 5-9, a description of other embodiments of the offtake assembly 40 will now be provided, in which elements alike those described hereinabove bear like numerals. In FIG. 5, there is shown another embodiment of the offtake assembly 40 in which the tube 90 has lateral openings 96 extending from an interior-tube surface 90i of the tube 90 to the exterior-tube surface 90e so as to be in fluid communication between inside the tube 90 and inside the conduit 80. The lateral openings 96 are positioned at or proximate to the resonance location L2 inside the line 60. Quantity, size, shape (e.g., bore(s), slot(s)), and spatial arrangement of such lateral openings 96 are determined with respect to high pressure amplitude areas of the resonance location L2 so as to assist migration of the bleed flow Fb away from the resonance location L2 via the conduit 80 and thereby assist migration of the relief flow Fr from inside of the conduit 80 to inside of the duct 30. In this example, a density of the lateral openings 96 varies along the length of the tube 90, and is greatest alongside a portion of the resonance location L2 being the closest to the conduit inlet 82. The density of the lateral openings 96 increases along the tube 90 toward the distal-tube end 92.

In some embodiments including the one shown in FIG. 5, the line inlet 62 flares as it meets the boss 36 near a periphery thereof so as to surround the proximal-tube end 94 as well as the relief opening 38. The boss 36, the line inlet 62 and the proximal-tube end 94 can be shaped such that the conduit 80 increases in size as it nears the conduit outlet 84, and thus can advantageously allow to optimize the configuration of the relief opening 38. For example, a plurality of openings 38A can be distributed next to one another, for example radially outwardly relative to the offtake opening 34.

Turning now to FIG. 6, yet another embodiment of the offtake assembly 40 is shown, in which the conduit 80 is alternatively formed by an interior of the tube 90. In such embodiments, the proximal-tube end 94 defines the conduit outlet 34, and meets the outer-duct wall 32 so as to follow a periphery of the relief opening 38. The distal-tube end defines the conduit inlet 82.

Referring to FIGS. 7 to 9, there is shown yet another embodiment of the offtake assembly 40, in which the conduit 80 is formed by an interior of a tube 100 provided outside the line 60. A distal end 102 of the tube 100, which defines the conduit inlet 82, is fluidly connected to the line 60 at the resonance location L2. A proximal end 104 of the tube 100 defines the conduit outlet 84 and is fluidly connected to the relief opening 38 in the duct 30 such that the resonance location L2 inside the line 60 is in fluid communication with inside the duct 30. In this example, the relief opening 38 is located proximate to the offtake opening 34 and the tube 100 runs alongside the line 60. In alternate implementations, the relief opening 38 may be defined in the outer-duct wall 32 at a location remote from the offtake opening 34, for example further downstream and away from the boss 36, or even upstream of the offtake opening 34, so long as a suitable pressure differential is attainable between inside the line 60 at the resonance location L2 and inside the duct 30 at the location of the relief opening 38.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, the present technology may be implemented such that the offtake location and the relief location are located in different ducts/air cavities. Yet further modifications could be implemented by a person of ordinary skill in the art in view of the present disclosure, which modifications would be within the scope of the present technology.

The invention claimed is:

1. A gas turbine engine comprising:
   a duct extending about an axis, the duct including an outer-duct wall having an interior-duct surface circumscribing an interior of the duct and an exterior-duct surface radially outward of the interior-duct surface relative to the axis, the outer-duct wall defining an offtake opening extending from the interior-duct surface to the exterior-duct surface, the offtake opening in fluid communication between an offtake location inside the duct and outside the duct, and
   a bleed air offtake assembly including:
      an air line in fluid communication with inside the duct via the offtake opening, the air line having a first-line end defining a line inlet proximate to the outer-duct wall and a second-line end spaced from the first-line end;
      a valve located outside the duct and fluidly connected to the air line via the second-line end;
      a conduit having a conduit inlet in fluid communication with inside the air line at a resonance location between the first-line end and the second-line end upstream of the valve, and a conduit outlet in fluid communication with inside the duct at a relief location spaced from the offtake location, wherein the conduit is located inside the air line; and
      a tube extending from the exterior-duct surface to the resonance location inside the air line, the tube having an exterior-tube surface, the air line has an interior-line surface surrounding the exterior-tube surface, and the conduit has an annular shape circumscribed inwardly by the exterior-tube surface and outwardly by the interior-line surface.

2. The gas turbine engine of claim 1, wherein the outer-duct wall defines a relief opening extending from the interior-duct surface to the exterior-duct surface, and the conduit outlet is in fluid communication with inside the duct via the relief opening.

3. The gas turbine engine of claim 2, wherein the relief opening includes a plurality of bores.

4. The gas turbine engine of claim 1, wherein a portion of the tube and a portion of the air line have cylindrical shapes that are coaxial to one another.

5. The gas turbine engine of claim 1, wherein the tube defines at least one lateral opening in fluid communication between inside the tube and inside the conduit.

6. The gas turbine engine of claim 1, wherein the outer-duct wall defines a relief opening extending from the interior-duct surface to the exterior-duct surface, the relief opening surrounded by the line inlet, the tube having an interior defining the conduit and opposite ends respectively defining the conduit inlet and the conduit outlet, the conduit outlet in fluid communication with inside the duct via the relief opening.

7. The gas turbine engine of claim 1, wherein the outer-duct wall has a boss projecting into the duct, the boss defining the offtake opening and a relief opening, the conduit outlet in fluid communication with inside the duct via the relief opening.

8. The gas turbine engine of claim 7, wherein the boss has a fore-facing side defining the offtake opening and an aft-facing side defining the relief opening.

9. The gas turbine engine of claim 1, wherein the gas turbine engine is a turbofan gas turbine engine and the duct is a bypass duct.

10. The gas turbine engine of claim 9, wherein the duct has a duct inlet upstream of the offtake opening and the relief location is downstream of the offtake location relative to the duct inlet.

11. The gas turbine engine of claim 1, wherein the gas turbine engine is a turboshaft gas turbine engine having a first stage compressor and a second stage compressor downstream of the first stage compressor, and the duct defines a bleed air cavity of the second stage compressor.

12. The gas turbine engine of claim 1, wherein the gas turbine engine is a turboprop gas turbine engine having a compressor and the duct defines a bleed air cavity of the compressor.

13. A gas turbine engine comprising:
   a duct extending about an axis, the duct including an outer-duct wall having an interior-duct surface circumscribing an interior of the duct and an exterior-duct surface radially outward of the interior-duct surface relative to the axis, the outer-duct wall defining an offtake opening extending from the interior-duct surface to the exterior-duct surface, the offtake opening in fluid communication between inside the duct and outside the duct, and a bleed air offtake assembly including:
   an air line in fluid communication with inside the duct via the offtake opening, the air line having a first-line end defining a line inlet proximate to the outer-duct wall and a second-line end spaced from the first-line end;
   a valve located outside the duct and fluidly connected to the air line via the second-line end, and
   a tube extending from the exterior-duct surface to a resonance location inside the air line, the tube having an exterior-tube surface surrounded by an interior-line surface of the air line so as to define an annular conduit therebetween, the annular conduit in fluid communication between the resonance location and inside the duct.

14. The gas turbine engine of claim 13, wherein the tube has a proximal-tube end surrounding the offtake opening, the outer-duct wall defines a relief opening spaced from the proximal-tube end, and the line inlet surrounds the proximal-tube end and the relief opening.

15. The gas turbine engine of claim 14, wherein the outer-duct wall defines a boss projecting into the duct, the offtake opening is defined in a fore-facing side of the boss and the relief opening is defined in an aft-facing side of the boss.

16. The gas turbine engine of claim 14, wherein the relief opening includes a plurality of bores.

17. The gas turbine engine of claim 16, wherein the plurality of bores are distributed around the proximal-tube end.

18. A gas turbine engine comprising: a duct extending about an axis, the duct including an outer-duct wall having an interior-duct surface circumscribing an interior of the duct and an exterior-duct surface radially outward of the interior-duct surface relative to the axis, the outer-duct wall defining an offtake opening extending from the interior-duct surface to the exterior-duct surface, the offtake opening in fluid communication between an offtake location inside the duct and outside the duct, and a bleed air offtake assembly including: an air line in fluid communication with inside the duct via the offtake opening, the air line having a first-line end defining a line inlet proximate to the outer-duct wall and a second-line end spaced from the first-line end; a valve located outside the duct and fluidly connected to the air line via the second-line end; a conduit having a conduit inlet in fluid communication with inside the air line at a resonance location between the first-line end and the second-line end upstream of the valve, and a conduit outlet in fluid communication with inside the duct at a relief location spaced from the offtake location, wherein the conduit is located inside the air line; wherein the outer-duct wall defines a relief opening extending from the interior-duct surface to the exterior-duct surface, the relief opening surrounded by the line inlet; and a tube having an interior defining the conduit and opposite ends respectively defining the conduit inlet and the conduit outlet, the conduit outlet in fluid communication with inside the duct via the relief opening.

* * * * *